United States Patent [19]
Curtis

[11] 3,831,779
[45] Aug. 27, 1974

[54] BAR SORTER
[75] Inventor: William I. Curtis, Middleburg Heights, Ohio
[73] Assignee: The Hill Acme Company, Cleveland, Ohio
[22] Filed: Feb. 27, 1973
[21] Appl. No.: 336,190

[52] U.S. Cl............................... 214/1 P, 198/219
[51] Int. Cl................................................ B23q 5/22
[58] Field of Search........... 214/1 P, 1 PB; 198/219; 209/74

[56] References Cited
UNITED STATES PATENTS
3,419,159  12/1968  Schaller et al...................... 214/1 P
3,506,142  4/1970   White................................. 214/1 P
3,670,902  6/1972   Kaplan .............................. 214/1 P Primary Examiner—M. Henson Wood, Jr.
Assistant Examiner—Gene A. Church
Attorney, Agent, or Firm—Baldwin, Egan, Walling & Fetzer

[57] ABSTRACT
A bar sorter for unscrambling elongated bars stacked in parallel horizontal position and delivering them one at a time to a preselected work area. The bar sorter includes a bar holding magazine for holding the bars in stacked horizontal parallel position, and a coacting walking beam type feeder mechanism disposed adjacent the magazine for taking bars from the magazine and delivering them one at a time to an associated work station. The feeder includes a plurality of spaced parallel stationary arms disposed adjacent the magazine for supporting the bars in successive preselected stepped positions thereon. The feeder also includes a pair of spaced parallel walking beam type moving arms interposed between the stationary arms for advancing the bars from the magazine thence to the successive preselected stepped positions on the stationary arms in walking beam fashion, one at a time to an associated work area. The steps on the stationary arms may be adjusted to accommodate bars of various cross-sectional sizes. A pusher lever is provided to push extra bars off the stationary steps and back to the magazine in case more than one bar is disposed on a stationary step. The magazine is provided with hydraulically actuated lifting arms to selectively advance the bars to the feeder.

7 Claims, 4 Drawing Figures

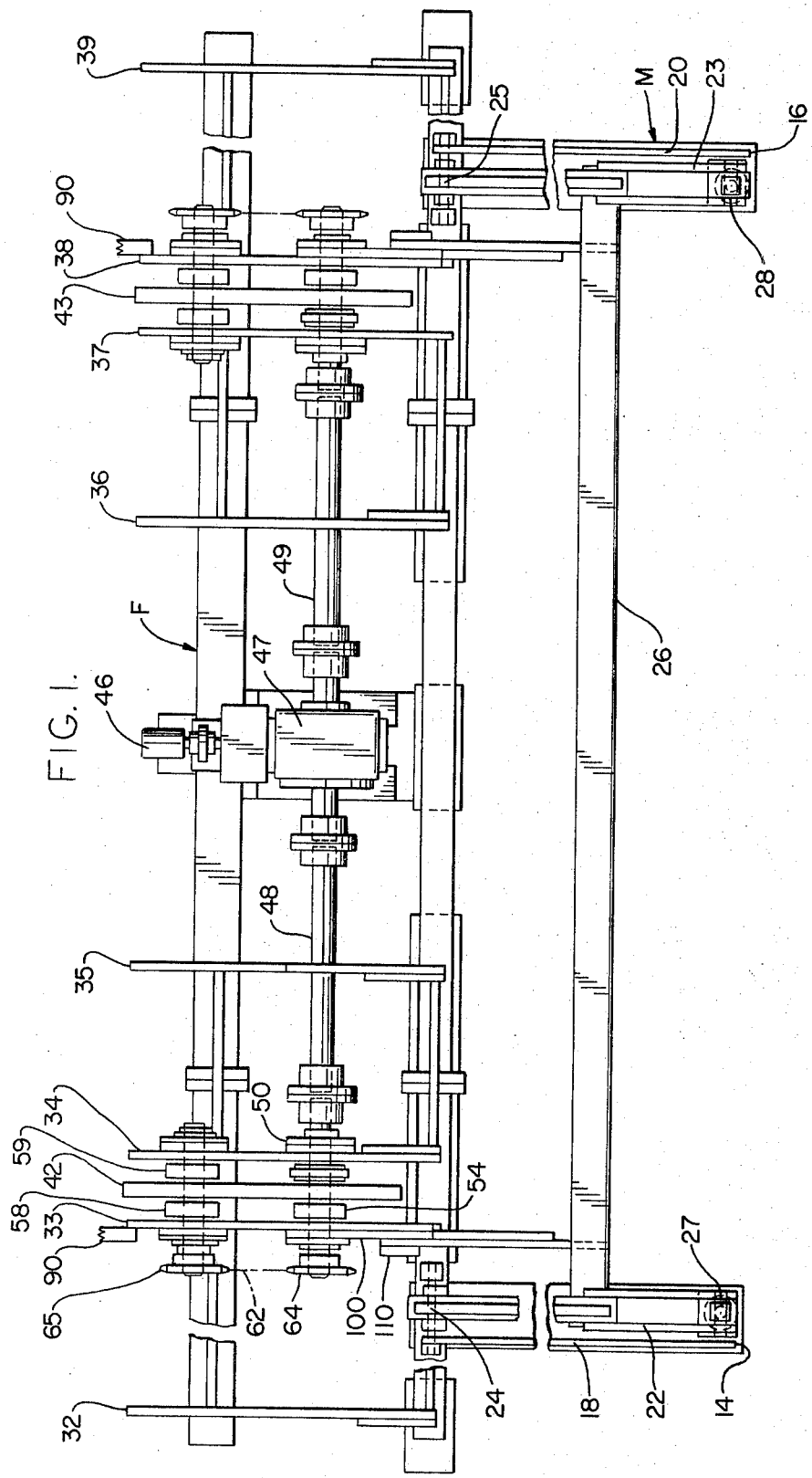

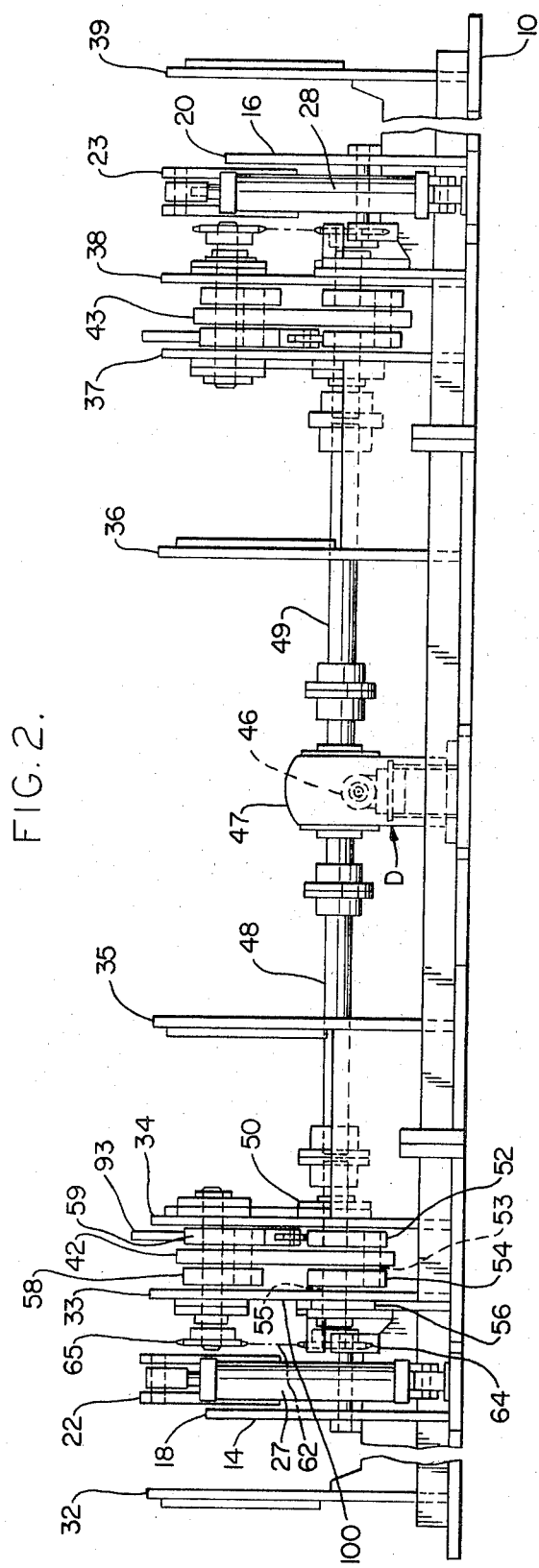

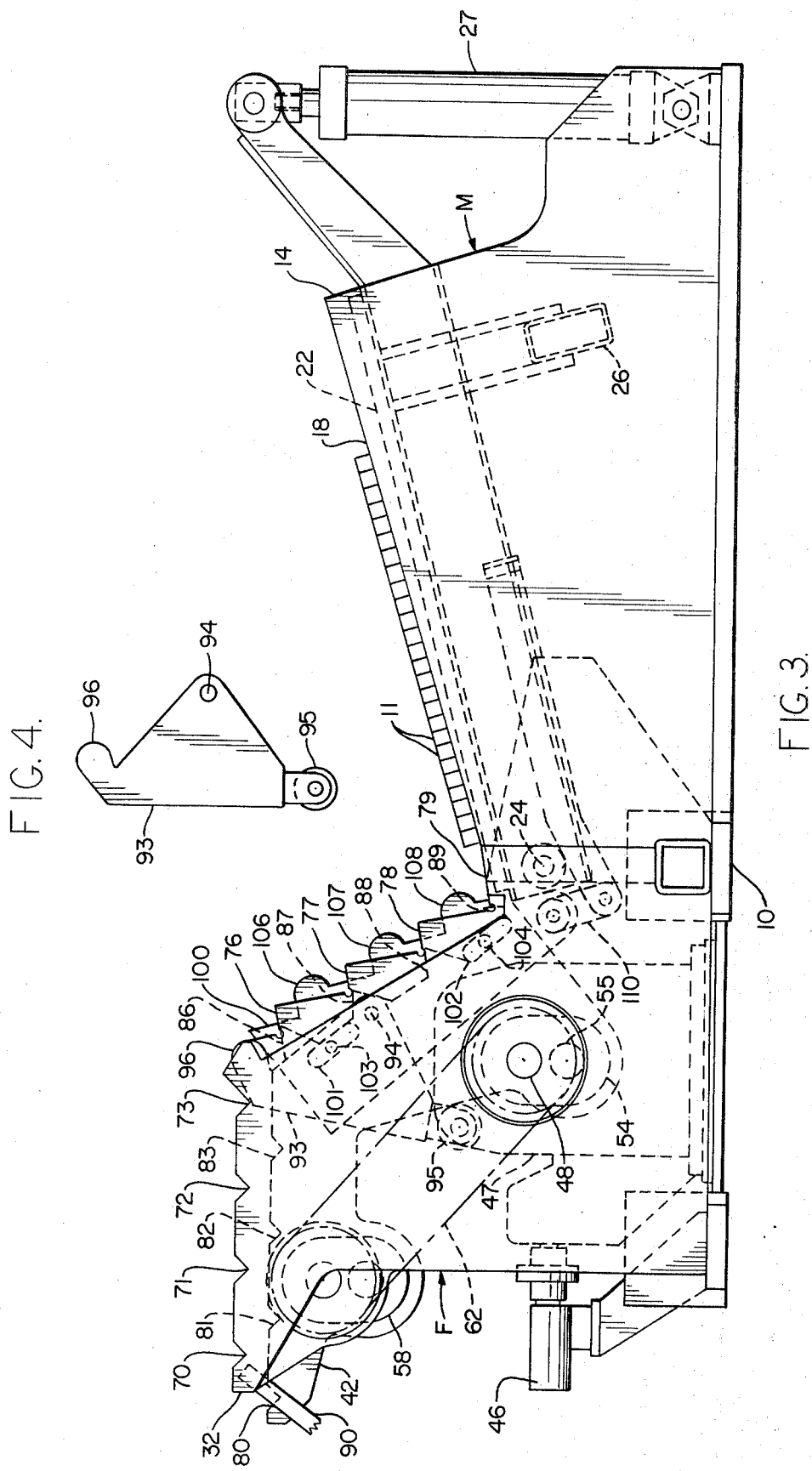

BAR SORTER

This invention relates to bar sorters and more particularly to a walking beam type bar sorter for unscrambling parallel stacked elongated bars and delivering them one at a time to a work station.

There has long been a problem in the expeditious and efficient handling of heavy steel bars. Bars 2 to 4 inches square or larger and in lengths of 20 to 30 feet or more, for example, are usually dumped adjacent a work area in parallel horizontal stacked relation. From such stack, they must be moved, one at a time, to a work station such as a cutting operation. This is usually effected by an overhead crane, which is cumbersome and time-consuming.

Therefore, it is an object of the invention to provide a bar sorter for unscrambling parallel stacked bars and delivering them one at a time in a quick and efficient manner to a work area.

A further object of the invention is to provide a bar sorter of the above type that is simple in construction, economical to manufacture, and highly effective in operation.

Briefly, the foregoing objects are accomplished by the provision of a bar sorter including a base, a bar holding magazine disposed on the base for holding the bars in stacked horizontal parallel position, and a coacting walking beam feeder mechanism disposed on the base adjacent the magazine for taking bars from the magazine and delivering them one at a time to a conveyor or work station.

The feeder includes a plurality of spaced parallel stationary arms disposed on the base adjacent the magazine and having spaced steps and notches for supporting the bars in successive preselected positions. The feeder further includes a pair of spaced parallel walking beam type moving arms interposed between the stationary arms for advancing the bars from the magazine, thence to the successive preselected positions on the stationary arms, thence one at a time to an associated work area. The moving arms are mounted on eccentrics which, in turn, are mounted on a drive shaft driven by a suitable drive means, to effect a walking beam type motion to the moving arms.

An adjustment plate having spaced steps is slidably disposed on the side of at least one stationary arm (in coaction with the steps thereon) so that the stationary arms may receive bars of different cross-sectional sizes thereon.

A bell crank type pusher lever is preferably mounted on at least one of the stationary arms and is actuated by an adjacent eccentric to push any extra bar off the top step of the stationary arm when such top step inadvertently contains two bars.

Bars on the magazine may be advanced to the feeder by spaced parallel hydraulically actuated lifting arms which slope toward the feeder and may be lifted above the bar holding level of the magazine to slide or advance the bars to the feeder.

Other objects and advantages of the invention will be apparent from the following description taken in conjunction with the drawings wherein:

FIG. 1 is a top plan view of a bar sorter mechanism of the invention;

FIG. 2 is a front elevational view of the mechanism shown in FIG. 1;

FIG. 3 is an enlarged left-end view of the mechanism shown in FIG. 2, and

FIG. 4 is a side view of the pusher lever partially shown in FIG. 3.

Although the invention is shown and described herein with reference to unscrambling bars of square cross-section, it will be understood that it may be used to unscramble any type of elongated bar.

The terms and expressions which are employed herein are used as terms of description, and not of limitation, and there is no intention, in the use of such terms and expressions, of excluding any equivalents of the features shown or described, or portions thereof, but it is recognized that various modifications are possible within the scope of the invention claimed.

Referring to the drawings, there is shown a bar sorter, constructed in accordance with the invention, and including a base 10, a holding means or bar holding magazine M disposed on the base for holding the bars 11 in stacked parallel horizontal position, and a coacting feed means or walking beam feeder mechanism F disposed on the base adjacent the magazine for taking bars from the magazine and delivering them one at a time to an associated work station disposed to the left of feeder F in FIG. 3.

The magazine M includes spaced side walls 14 and 16 disposed on the base 10, such side walls having top edges 18 and 20, respectively which support the stacked bars 11, such top edges sloping downwardly toward the feeder F so that the bars may slide down thereto. To assist in sliding the bars toward the feeder, the magazine M is provided with a pair of spaced parallel pivotal lifting arms 22 and 23 pivoted at their inner ends at the points 24 and 25, respectively, at the bottom front portion of the feeder, and joined by a connecting beam 26. The upper outer ends of the lifting arms 22,23 are pivotally connected to the hydraulic piston-cylinder mechanisms 27 and 28 respectively, which are secured to the base 10. The outer ends of the arms 22,23 are disposed higher than the inner ends of such arms. The lifting arms 22,23 are normally disposed just below the normal bar holding level of the magazine (i.e., below the level of the side wall top edges 16 and 18, as shown in FIG. 3). When the piston-cylinder mechanisms 27,28 are actuated, the lifting arms 22,23 coactively rise and pivot about the pivot points 24,25, whereby the bars 11 are lifted off the wall top edges 18 and 20, and slide on the lift arms 22,23, down to the feeder F, as such lifting arms are now substantially sloped towards the feeder.

The feeder F includes a plurality of spaced parallel stationary arms 32, 33, 34, 35, 36, 37, 38, 39, disposed on the base 10 adjacent the magazine M for supporting the bars 10 in successive preselected stepped and notched positions thereon, said feeder further including a pair of spaced parallel walking beam type moving arms, 42,43, interposed between the stationary arms 33, 34, and 37,38 respectively, for advancing the bars from the magazine, thence to successive preselected positions on the stationary arms, thence one at a time to an associated work area to the left of the feeder F (FIG. 3), as will be hereinafter explained.

Drive means D is provided to drive the feeder F and includes a motor 46 which drives a reduction gear mechanism 47 which, in turn, drives the drive shafts 48 and 49. The moving arms 42,43 are mounted on eccentrics which, in turn, are mounted on the respective drive shafts 48 and 49. Since the eccentric structure is identical for each of the moving arms 42,43, only one will be described in detail.

The drive shaft 48 is rotatably positioned in a bearing 50 disposed in the stationary arm 34. Secured to the outer end of the drive shaft 48 is an eccentric 52 (FIG. 2). The outer end of the eccentric 52 has secured thereto a shaft 53 which is secured to the coacting eccentric 54 mounted on the shaft 55 rotatably mounted on the bearing 56 in the stationary arm 33. Interposed between the eccentrics 52, 54, is the moving arm 42 which is rotatably secured to the eccentric shaft 53. The coacting eccentrics 52,54, in effect form a single lower eccentric. A like structure is disposed at the top of the moving arm 42 wherein spaced coacting eccentrics 58,59 carry the upper portion of the arm 42 therebetween. The chain drive 62 on the sprockets 64, 65, coordinate and balance the driving of such upper and lower eccentrics acting on the arm 42 to effect a smooth walking beam motion thereto. The moving arm 43 is actuated by a like eccentric structure.

The stationary arms and the moving arms have horizontal top edges and the front edges of such stationary and moving arms (facing the magazine M) slope downwardly and outwardly toward the magazine. Such top and front edges have successive, spaced, coacting, prepositioned bar holding means for releasably retaining the bars 10 thereon in predetermined sequential positions. More specifically, the stationary arm 32, (FIG. 3), for example, has notches 70, 71, 72 and 73 formed in its top edge, and its front edge has steps 76, 77, 78 and 79 formed therein; and all stationary arms are formed with identical notches and steps. In like structure, the moving arm 42 has notches 80, 81, 82 and 83 formed in its top edge, and its front edge has steps 86, 87, 88 and 89 formed therein; and the moving arm 43 is formed with identical notches and steps.

In operation, the moving arms 42 and 43 are rotated in eccentric motion to effect a walking beam movement by the aforedescribed eccentrics, whereby such moving arms pick up bars 10 from the magazine M and place them one at a time on successive higher steps and then on successive notches on the stationary bars. More specifically, initially a bar 10 slides down the magazine and rests on stationary arm step 79. Then, as the moving arm is eccentrically rotated one turn, moving arm step 89 picks up the bar 11 from stationary arm step 79 and places it on stationary arm step 78 in walking beam fashion. With the next eccentric rotative turn of the moving arm 42, moving arm step 88 takes the bar off of stationary arm step 78 and places it on stationary arm step 77. This coactive operation between the moving and stationary arms continues whereby the bar is moved on to stationary arm step 76, thence over to the top edge and into notch 73, thence notch 72, thence notch 71, thence notch 70, after which the moving arm notch 80 removes the bar from notch 70 and places it on a slide 90 on which it slides to an associated conveyor or work station (not shown) to the rear (to the left in FIG. 2) of the feeder.

If two bars should become placed on the stationary arm steps, the top-most bar would be pushed back to the magazine M by a bell-crank type push lever 93 (FIGS. 3 and 4) which is pivoted at point 94, whereby when the eccentric 59 is rotated (counterclockwise) it strikes the lower wheel portion 95 of the push lever causing such lever to partially rotate clockwise (FIG. 3), such that the push lever top nib 96 pushes the higher of two bars on the step 76 back to the magazine M.

The feeder F of the invention is adapted to handle a range of elongated bars 10 of different cross-sectional size. This is effected by an adjustment plate slidably disposed for limited movement on at least two of the stationary arms. The stationary arm 33, for example, contains an adjustment plate 100, which is slidably disposed on the arm 33 adjacent and parallel to the front stepped edge thereof by the slots 101, 102, and bolts 103, 104, respectively, construction. The adjustment plate 100 has steps 106, 107, and 108 which coact with the stationary arm steps to accommodate bars of different cross-sectional size. The adjustment plate may be releasably retained in any one of its slidable positions by any suitable adjustment means such as, for example, the adjustment plate adjustment link 110.

Thus, the invention handles very heavy bars quickly and efficiently. Once a bar is delivered on a conveyor to a shear, for example, an automatic trigger device could signal the bar sorter to load another bar on the conveyor. The bar sorter shown in the drawings, for example, can hold ten tons of 2-¼ inch square steel bars in the magazine M. The bars may range from 16 to 20 feet in length. The bar sorter feeds as fast as four bars per minute. A system consisting of a bar sorter, conveyor and cutting area, can handle 10 tons of steel bars completely unattended.

What is claimed is:

1. A bar sorter for unscrambling elongated bars stacked in elongated horizontal position and delivering them one at a time to a preselected area comprising, a base, a bar holding magazine disposed on the front of said base for holding the bars in stacked horizontal parallel relation, a coacting feeder mechanism disposed on the rear of said base adjacent the magazine for taking bars from said magazine and delivering them one at a time to an associated work station, said feeder including a plurality of spaced parallel stationary arms disposed on said base adjacent the magazine for supporting the bars in successive preselected parallel positions thereon, said feeder further including at least a pair of spaced parallel walking beam type moving arms interposed between the stationary arms for advancing the bars from the magazine thence to successive preselected positions on the stationary arms thence one at a time to an associated work area, drive means mounted on the base for actuating said moving arms, said moving arms being eccentrically mounted to effect a walking beam motion to such moving arms, said stationary arms and said moving arms having horizontal top edges, and the front edge of such stationary and moving arms facing the magazine sloping downwardly and outwardly toward the magazine, said top and front edges of such stationary arms having a plurality of successive coacting preselected bar holding means for releasably retaining the bars thereon in predetermined sequential positions.

2. The structure of claim 1 wherein said bar holding means are a plurality of spaced notches formed in said top edges and a plurality of spaced steps formed in said front edges.

3. The structure of claim 2 and further including a stepped adjustment plate slidably disposed on the side of at least one of the stationary arms adjacent and parallel to the front edge thereof, said adjustment plate having a plurality of spaced steps on its outer front edge disposed in coacting relation with the steps on the adjacent stationary arm for receiving bars of different cross-sectional size thereon in coaction with the stationary arm steps, and adjustment means for releasably retaining said adjustment plate in any one of a plurality of slidable positions on the adjacent stationary bar to accommodate bars of various cross-sectional size thereon.

4. The structure of claim 1 and further including advancing means on said magazine for advancing bars on the magazine to the feeder.

5. The structure of claim 4 wherein said advancing means on the magazine includes spaced parallel rotatable lifting arms having their inner ends pivotally mounted to the bottom portion of the feeder, and piston cylinder mechanisms secured at one of their ends to the base and at their other end to the free outer ends of the lifting arms at a point higher than the inner ends of the lifting arms, said lifting arms normally being disposed just below the bar holding level of the magazine and adapted to be coactively raised by the piston-cylinder mechanisms, whereby the lifting arms raise above the bar holding level of the magazine and thence slope downwardly toward the feeder to feed the bars thereto.

6. The structure of claim 1 and further including a drive shaft rotatably mounted on the feeder mechanism and connected to the drive means, at least one eccentric mounted on the drive shaft, said moving arms being operatively connected to the eccentrics to effect a walking beam motion to the moving arms on actuation of the drive means.

7. The structure of claim 6 and further including at least one bell-crank type push lever mounted on one of the stationary arms for actuation by an adjacent eccentric to push any extra top bar off the top step of the stationary bar when such top step inadvertently contains two bars.

* * * * *